(12) United States Patent
Sahawneh et al.

(10) Patent No.: US 10,083,471 B2
(45) Date of Patent: Sep. 25, 2018

(54) COMPUTING SYSTEM PREDICTIVE BUILD

(71) Applicant: International Business Machines Corporation, Armonk, NY (US)

(72) Inventors: Rami J. Sahawneh, Hyde Park, NY (US); Gerald G. Stanquist, Salt Point, NY (US); John M. Waldron, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 14/883,313

(22) Filed: Oct. 14, 2015

(65) Prior Publication Data

US 2016/0042422 A1 Feb. 11, 2016

Related U.S. Application Data

(63) Continuation of application No. 13/853,916, filed on Mar. 29, 2013, now Pat. No. 9,218,583.

(51) Int. Cl.
*G06Q 30/06* (2012.01)
*G06Q 10/06* (2012.01)
(Continued)

(52) U.S. Cl.
CPC ... *G06Q 30/0621* (2013.01); *G05B 19/41865* (2013.01); *G06N 5/04* (2013.01);
(Continued)

(58) Field of Classification Search
CPC ......... G06Q 30/0621; G06Q 10/06313; G06Q 30/0282; G06Q 30/0635; G05B 19/41865; G06N 5/04

See application file for complete search history.

(56) References Cited

U.S. PATENT DOCUMENTS 6,067,525 A * 5/2000 Johnson ................. G06Q 10/06
 705/7.13
7,840,441 B2 11/2010 Erickson et al.
(Continued)

OTHER PUBLICATIONS

Final office action for U.S. Appl. No. 14/041,472 dated Sep. 2, 2016, 10 pp.

(Continued)

*Primary Examiner* — Sujay Koneru
(74) *Attorney, Agent, or Firm* — Damion Josephs (57) ABSTRACT

Features to include within a predictive build of a computing system are selected. The predictive build is an anticipated final build of the computing system prior to receiving a firm customer order for the computing system in accordance with which an actual final build of the computing system is then built. A marginal cost of first building the predictive build and then modifying the predictive build to realize the actual final build, as compared to building the actual final build without first building the predictive build and then modifying predictive build to realize the actual final build, is estimated based on the features selected. Responsive to determining that the marginal cost is less than a predetermined acceptable marginal cost limit, the predictive build is built prior to receiving the firm customer order, and then is modified to realize the actual final build upon receiving the firm customer order.

16 Claims, 3 Drawing Sheets

(51) Int. Cl.
*G06Q 30/02* (2012.01)
*G06N 5/04* (2006.01)
*G05B 19/418* (2006.01)

(52) U.S. Cl.
CPC ... *G06Q 10/06313* (2013.01); *G06Q 30/0283* (2013.01); *G06Q 30/0635* (2013.01)

(56) References Cited

U.S. PATENT DOCUMENTS

| | | | |
|---|---|---|---|
| 9,710,838 B2 | 7/2017 | Sahawneh et al. | |
| 2002/0087490 A1* | 7/2002 | Ueda | G06Q 10/06 705/400 |
| 2002/0178075 A1 | 11/2002 | Olson-Williams et al. | |
| 2005/0149377 A1* | 7/2005 | Schierholt | G06Q 10/06 705/400 |
| 2005/0262462 A1 | 11/2005 | Janakiraman et al. | |
| 2005/0283410 A1 | 12/2005 | Gosko | |
| 2006/0259370 A1* | 11/2006 | Everett | G06Q 30/02 705/80 |
| 2007/0299730 A1 | 12/2007 | Erickson et al. | |
| 2008/0300933 A1* | 12/2008 | Britton | G06Q 10/06 705/30 |
| 2009/0177293 A1 | 7/2009 | Reginald et al. | |
| 2009/0259534 A1* | 10/2009 | Utter | G06Q 20/10 705/14.1 |
| 2009/0271255 A1* | 10/2009 | Utter | G06Q 30/02 705/14.1 |
| 2010/0138026 A1* | 6/2010 | Kaushal | G05B 13/0265 700/104 |
| 2010/0151816 A1* | 6/2010 | Besehanic | G06Q 30/02 455/405 |
| 2011/0282800 A1* | 11/2011 | Chander | G06Q 10/063 705/348 |
| 2012/0019643 A1* | 1/2012 | Gideon | H04N 21/25883 348/77 |
| 2012/0047010 A1* | 2/2012 | Dowling | G06Q 30/02 705/14.45 |
| 2012/0109662 A1* | 5/2012 | Shah | G06Q 30/0283 705/1.1 |
| 2012/0239809 A1* | 9/2012 | Mazumdar | H04L 43/04 709/224 |
| 2013/0066675 A1 | 3/2013 | Bercaw | |
| 2013/0173341 A1 | 7/2013 | Bagwell et al. | |
| 2013/0291001 A1* | 10/2013 | Besehanic | H04N 21/44204 725/20 |
| 2014/0081767 A1* | 3/2014 | Zhang | G06Q 30/02 705/14.66 |
| 2014/0297351 A1 | 10/2014 | Sahawneh et al. | |
| 2014/0297452 A1 | 10/2014 | Sahawneh et al. | |
| 2015/0319490 A1* | 11/2015 | Besehanic | H04N 21/258 725/19 |

OTHER PUBLICATIONS

Notice of allowance for U.S. Appl. No. 14/041,472 dated Mar. 15, 2017, 9 pp.
Examiner interview summary for U.S. Appl. No. 14/041,472 dated Nov. 23, 2016, 3 pp.
Non-final office action for U.S. Appl. No. 14/041,472 dated May 12, 2016, 22 pp.
Non-final office action for U.S. Appl. No. 13/853,916 dated Mar. 27, 2015, 12 pp.
Notice of allowance for U.S. Appl. No. 13/853,916 dated Aug. 24, 2015, 9 pp.

* cited by examiner

COMPUTING SYSTEM PREDICTIVE BUILD

BACKGROUND

Server computing devices have become the lifeblood of many organizations. For large organizations like business enterprises and governmental concerns, servers can be quite sophisticated and large pieces of hardware, involving many different components assembled in a dizzying number of particular configurations. As computing needs have grown, such organizations have purchased more and more servers, both to replace outdated existing servers and supplement existing servers with increased capacity.

SUMMARY

An example method includes selecting features to include within a predictive build of a computing system. The predictive build is an anticipated final build of the computing system prior to receiving a firm customer order for the computing system in accordance with which an actual final build of the computing system is built. The method includes estimating a marginal cost of first building the predictive build and then modifying the predictive build to realize the actual final build, as compared to building the actual final build without first building the predictive build and then modifying predictive build to realize the actual final build, based on the features selected. The method includes, responsive to determining that the marginal cost is less than a predetermined acceptable marginal cost limit, building the predictive build prior to receiving the firm customer order, and modifying the predictive build to realize the actual final build upon receiving the firm customer order.

An example storage device stores a computer program executable by a processor to perform a method. The method includes selecting features to include within a predictive build of a computing system. The predictive build is an anticipated final build of the computing system prior to receiving a firm customer order for the computing system in accordance with which an actual final build of the computing system is then built. The method includes estimating a marginal cost of first building the predictive build and then modifying the predictive build to realize the actual final build, as compared to building the actual final build without first building the predictive build and then modifying predictive build to realize the actual final build, based on the features selected. The method includes responsive to determining that the marginal cost is less than a predetermined acceptable marginal cost limit, indicating that the predictive build should be built prior to receiving the firm customer order. The method includes responsive to determining that the marginal cost is greater than the predetermined acceptable marginal cost limit, indicating that the predictive build should not be built prior to receiving the firm customer order.

An example system includes a computing device, and a storage device storing a database of permissible predictive builds of a computing system. The computing device is to select features to include within a predictive build of the computing system. The predictive build is an anticipated final build of the computing system prior to receiving a firm customer order for the computing system in accordance with which an actual final build of the computing system is then built. The computing device is to, if the predictive build is identical to any of the permissible predictive builds stored in the database, indicate that the predictive build should be built. The computing device is to if the predictive build is not identical to any of the permissible predictive builds, estimate, based on the features selected, a marginal cost of first building the predictive build and then modifying the predictive build to realize the actual final build. This marginal cost is as compared to building the actual final build without first building the predictive build and then modifying predictive build to realize the actual final build. The computing device is to, if the marginal cost is less than a predetermined acceptable marginal cost limit, indicate that the predictive build should be built, and if the marginal cost is greater than the predetermined acceptable marginal cost limit, indicate that the predictive build should not be built.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, organizations employ sophisticated server computing devices. Such servers are generally not purchased "off the shelf," but rather are the subject of contracts with manufacturers who can customize servers to the organizations' needs and specifications in a bespoke manner. Server manufacture many times is performed under tight schedules, to meet both customer demands as well as internal manufacturer metrics.

Figure 1:
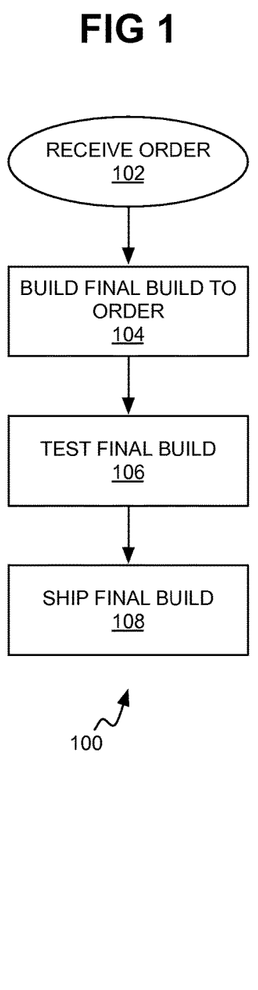
FIG. 1 is a flowchart of an example build-to-order process.

FIG. 1 shows an example build-to-order process 100. In this process 100, what is referred to as a build of a computing system is not started until a customer order for the computing system is received. As such, the order is received from a customer (102), and then the final build of the computing system of the customer order is built (104). After this final build has been tested (106), it is shipped to the customer in fulfillment of the customer order (108).

Figure 2:
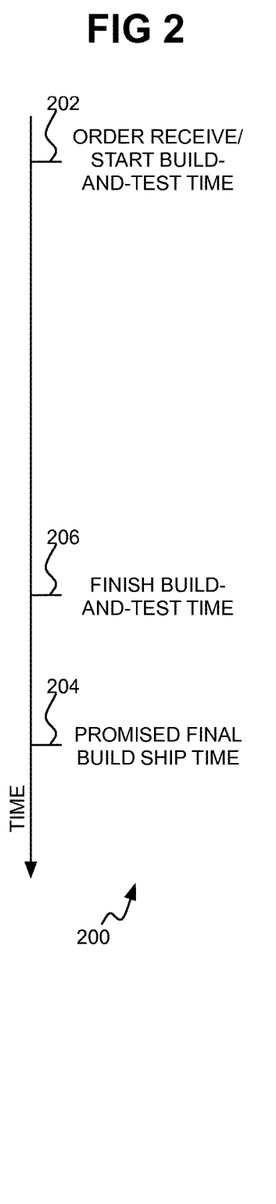
FIG. 2 is a diagram of example timing as to when an order is received, when the order is completed, and when fulfillment of the order is promised.

FIG. 2 shows an example timing diagram 200 of the various times associated with the build-to-order process 100. At a first time 202, a customer order for a computing system is received, and building and subsequent testing of a build of the computing system in satisfaction of the order is started. The customer order typically specifies a later second time 204 when the final build is to be shipped by, or this deadline may be associated with an internal-to-the-manufacturer metric, such as a quarterly deadline, and so on.

If building and testing of the final build can be finished at a third time 206 that is before the second time 204, then the build-to-order process 100 is satisfactory. That is, if the time 206 is before the time 204, then there is no need to deviate from the build-to-order process 100. This is because there is sufficient time between times 202 and 204 in which to build and test the final build in fulfillment of the customer order.

However, if the third time 206 is after the second time 204, then this means that the time at which the final build is to be shipped by will not be satisfied. This is because the length of time it takes to finish building and testing the final build of the computing system—i.e., the period of time between times 202 and 206—is too long to meet the desired ship time 204. As such, the build-to-order process 100 is unsatisfactory when the length of time between the customer order receipt time 202 and the promised ship time 204 is less than the length of time between the order receipt time 202 and the time 206 at which the final build has been built and satisfactorily tested.

Figure 3:
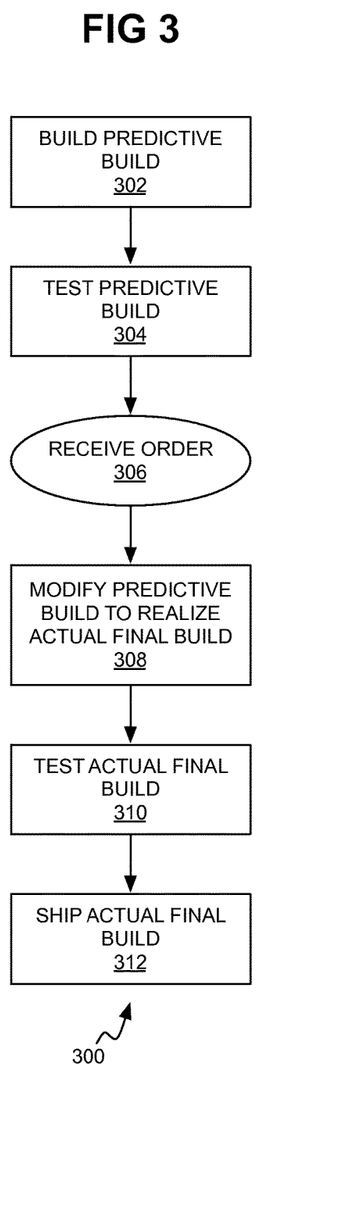
FIG. 3 is a flowchart of an example predictive build process.

FIG. 3 shows an example predictive build process 300 that can ameliorate the problems associated when the build-to-order process 100 is unsatisfactory. Prior to receiving a customer order for a computing system, a predictive build of the computing system is built (302) and tested (304). The predictive build is an anticipated final build of the computing system, which is the expected final build that will be specified in a customer order. Once the customer order is received (306), the predictive build of the computing system is then modified to realize the actual final build specified in the order (308). The actual final build of the computing system is tested (310) and shipped (312).

The idea behind the predictive build process 300 is that by building and testing a predictive build of a computing system prior to receiving a firm customer order for the computing system, a desired final build ship time can be satisfied where it could not be in the build-to-order process 100. That is, the time it takes to modify the predictive build to realize the actual final build and then test the actual final build is less than the period of time between receiving the customer order specifying the actual final build and the promised final build ship time. Where this is the case, the predictive build process 300 can thus be beneficial to satisfy particularly short deadlines specified in customer orders where the build-to-order process 100 would not satisfy them.

A difficulty with the predictive build process 300 is selecting the features of the computing system within the predictive build that nevertheless still permit the predictive build process 300 to be cost effective. There is both a monetary and a time penalty associated with using the predictive build process 300 in lieu of the build-to-order process 100. Conventionally, assessing this penalty to determine whether using the predictive build process 300 is beneficial is performed haphazardly, using "seat of the pants" guesses and gut instincts rather than in a scientific way. Disclosed herein are techniques to determine whether to employ the predictive build process 300 that are more rigorous by comparison.

Figure 4:
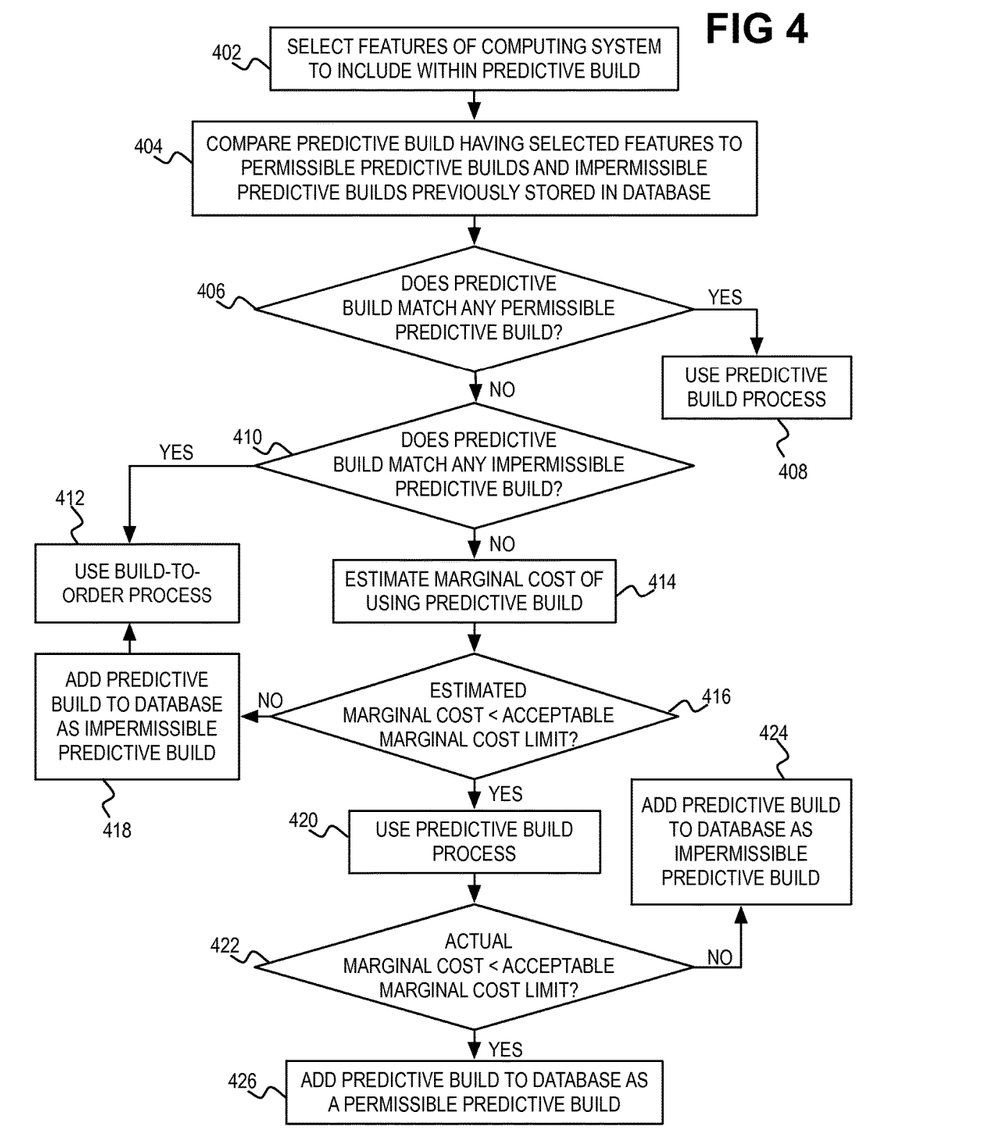
FIG. 4 is a flowchart of an example method for determining whether to use the predictive build process or the build-to-order process to satisfy an order for a computing system.

FIG. 4 shows an example method 400 for determining whether to use the predictive build process 300 or the build-to-order process 100 to satisfy an order for a computing system. Features of the computing system to include within a proposed predictive build of the computing system are selected (402). The features can include which hardware elements should be part of the predictive build, as well as in what configurations these elements should be configured. Further details regarding the feature selection process are provided later in the detailed description. Selecting the features of the computing system defines the proposed predictive build; that is, a predictive build is defined by its constituent features to be included as part of the predictive build.

This predictive build is compared to a database in which permissible predictive builds and/or impermissible predicted builds have been previously stored (404). Permissible predictive builds are predictive builds that should be built; that is, their corresponding computing systems should be built using the predictive build process 300. Impermissible predictive builds are predictive builds that should not be built; that is, their corresponding computing systems should be built using the build-to-order process 100.

If the predictive build matches any permissible predictive build (406), then the predictive build process 300 is used to satisfy the order for the computing system (408), or is indicated that it should be used. That is, the build-to-order process 100 is not used or is not indicated that it should be used. If the predictive build does not match any permissible predictive build (406) but matches any impermissible predictive build (410), then the build-to-order process 100 is used to satisfy the order for the computing system (412), or is indicated that it should be used. That is, the predictive build process 300 is not used or is not indicated that it should be used.

If the predictive build does not match any permissible predictive build (406) or any impermissible predictive build (410), then the marginal cost of using the predictive build process 300 instead of the build-to-order process 100 is estimated based on the features of the predictive build that were previously selected (414). This marginal cost is the marginal cost of first building the predictive build and then modify the predictive build to realize the actual final build to satisfy the order for the computing system, as compared to building the actual final build without first building the predictive build and thereafter modifying the predictive build to realize the actual final build. Further details regarding the marginal cost estimation process are provided later in the detailed description.

There is a predetermined acceptable marginal cost limit, which is the maximum marginal cost that the manufacturer is willing to expend in time and/or money to use the predictive build process 300 instead of the build-to-order process 100. If the estimated marginal cost is greater than the acceptable marginal cost limit (416), then the predictive build is added to the database as an impermissible predictive build (418), and the build-to-order process 100 is used (412). As such, the marginal cost will not have to be estimated for this predictive build in the future to determine that the build-to-order process 100 should be used instead of the predictive build process 300. However, if the estimated marginal cost is less than the acceptable marginal cost limit (416), then the predictive build process 300 is used instead of the build-to-order process 100 (420).

When the predictive build process 300 is finished, and an actual final build of the computing system shipped in satisfaction of the order for the computing system, the actual marginal cost of using the predictive build process 300 as compared to the build-to-order process 100 will be known. If the actual marginal cost is greater than the acceptable marginal cost limit (422), then the predictive build is added to the database as an impermissible predictive build (424), so that the predictive build process 300 is not used for this predictive build in the future. This situation corresponds to the estimated marginal cost being less than the acceptable marginal cost limit, but the actual marginal cost being greater than the acceptable marginal cost limit.

By comparison, if the actual marginal cost is less than the acceptable marginal cost limit, then the predictive build is added to the database as a permissible predictive build (426). As such, the predictive build process 300 will be used for this predictive build in the future, without having to estimate the marginal cost. This situation corresponds to both the estimated marginal cost and the actual marginal cost each being less than the acceptable marginal cost limit.

Figure 5:
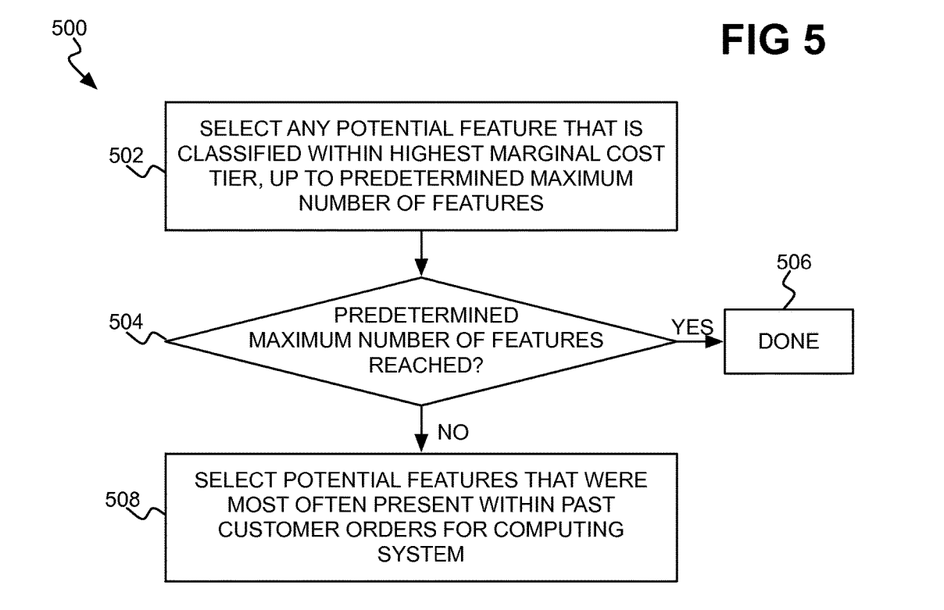
FIG. 5 is a flowchart of an example method for selecting the features to include within a predictive build of a computing system.

FIG. 5 shows an example method 500 for selecting the features to include within a predictive build of a computing system. Stated another way, the method 500 is for defining a predictive build of a computing system by selecting the features to include within the predictive build by which the predictive build is defined. The method 500 can be performed to implemented part 402 of the method 400.

In general, there is a pool of potential features that can be selected from to select the features to include within a predictive build. Furthermore, the features to include within the predictive build are selected from those potential features of the pool that were included in past iterations of the computing system—that is, in past actual builds of the computing system in fulfillment of past customer orders for the computing system. Each such potential feature has a classification and a distribution.

The classification of each potential feature corresponds a marginal cost of including the potential feature within the predictive build of the computing system. In one implementation, each potential feature is classified within a corresponding tier, from a highest marginal cost tier to a lowest marginal cost tier. Potential features within higher marginal cost tiers contribute more to the marginal cost of the predictive build, whereas potential features within lower marginal cost tiers contribute less to the marginal cost of the predictive build. Stated another way, features within higher marginal cost tiers are more expensive from a time or cost perspective to "undo" (i.e., remove or modify) in an actual final build of the computing system after having been included in a predictive build of the system that is modified to realize this actual final build. Features within lower marginal cost tiers are similarly less expensive to "undo" in the actual final build.

The marginal cost of including a feature within a predictive build can be equal to a sum of three costs or times. The first cost or time is the cost or time to install the feature into the computing system for an actual final build thereof. The second cost or time is the cost or time to arrange the feature into a desired configuration of the computing system for an actual final build thereof. The third cost or time is the cost or time to test the given feature as installed within the computing system for an actual final build thereof. The three costs may thus be summarized as installation, configuration, and testing costs, respectively. Each of these three costs or times can be obtained by averaging the costs and times of past actual final builds of the computing system in satisfaction with historical customer orders for the system.

In one implementation, there are four marginal cost tiers among which a feature can be classified. Each marginal cost tier may be defined by marginal feature-inclusion costs as a range of percentages, less than 100%, of the cost or time to test the final build of a computing system in the build-to-order process 100—that is, as a range of percentages no greater than 100% of the cost or time to perform part 106 of the build-to-order process 100. A feature of the highest marginal cost tier has a marginal cost that is above A % of the cost or time to perform part 106; a feature of the next highest tier has a marginal cost between A % and B % of the cost or time to perform part 106; a feature of the third highest tier has a marginal cost between B % and C %; and a feature of the lowest marginal cost tier has a marginal cost below C %. In one implementation, A, B, and C may be set to five, twenty-five, and seventy-five, respectively.

The distribution of each potential feature is the distribution of the potential feature within past customer orders of the computing system. The distribution indicates how often the given potential feature was present within the past customer orders. The distribution of a potential feature thus provides a measure of how often the feature was present within the actual builds of the computing system in fulfillment of past customer orders for the computing system in question.

Any potential feature that is classified within the highest marginal cost tier is selected first for inclusion within the potential build of the computing system (502), up to a predetermined maximum number of features. In one implementation, this predetermined maximum number may be six, for instance. Having a predetermined maximum number of features limits the processing required to perform the techniques disclosed herein. It has been found that a relatively small number of features contribute the most to the marginal cost of a predictive build, such that limiting the number of features to include within the predictive build is computationally efficient with an acceptable minimal loss of accuracy. If there are more features within the highest marginal cost tier than the predetermined maximum number of features, than the just the predetermined maximum number of potential features having the highest marginal costs are selected in part 502.

If the predetermined maximum number of features has been selected (504), then the method 500 is finished. Otherwise, however, potential features that were most often present within past customer orders of the computing system are selected for inclusion into the predictive build (508), based on their distributions. Selecting the highest marginal cost potential features in part 502 and the most present in prior customer order potential features in part 508 thus balances cost with frequency in the feature selection process.

Once the features have been selected for inclusion within a predetermined build of a computing system in accordance with the method 500 to effectuate part 402 of the method 400, the marginal cost of using the predictive build (i.e., the marginal cost of the predictive build) can be estimated in part 414 of the method 400 if necessary as follows. Specifically, what are referred to herein as marginal cost values of the feature included within the predictive build are added together to yield a sum that is the estimated marginal cost of the predictive build. The marginal cost value of a feature is generally based on the marginal cost of including the feature within the predictive build.

In one implementation, the marginal cost value of a feature is equal to the marginal cost of including the feature within the predictive build, multiplied by a number of instances of the feature to be included within the predictive build. For example, consider a feature that is a processor. There may be more than one processor included in the predictive build. Therefore, the marginal cost value of this feature is equal to the number of instances to be included in the predictive build, multiplied by the marginal cost value of the feature.

In one implementation, the number of instances of a feature to be included within the predictive build is selected as the sum of the mean of the feature's distribution within past customer orders for the computing system, and a predetermined value. As noted above, the distribution indicates how often the feature was present within the past customer orders for the computing system that is the subject of the predictive build in question. In one implementation, the predetermined value by which the mean is multiplied is equal to a standard deviation of the distribution multiplied by a predetermined positive constant, such as 0.5. The purpose of adding the predetermined value is to skew the number of instances of a feature for inclusion within the predictive build higher than the mean of the feature's distribution. This is beneficial, because it has been determined that in general, it is easier and/or less costly to remove an instance of a feature from a predictive build to realize an actual final build than it is to add an instance of the feature to the predictive build to realize the actual final build.

Figure 6:
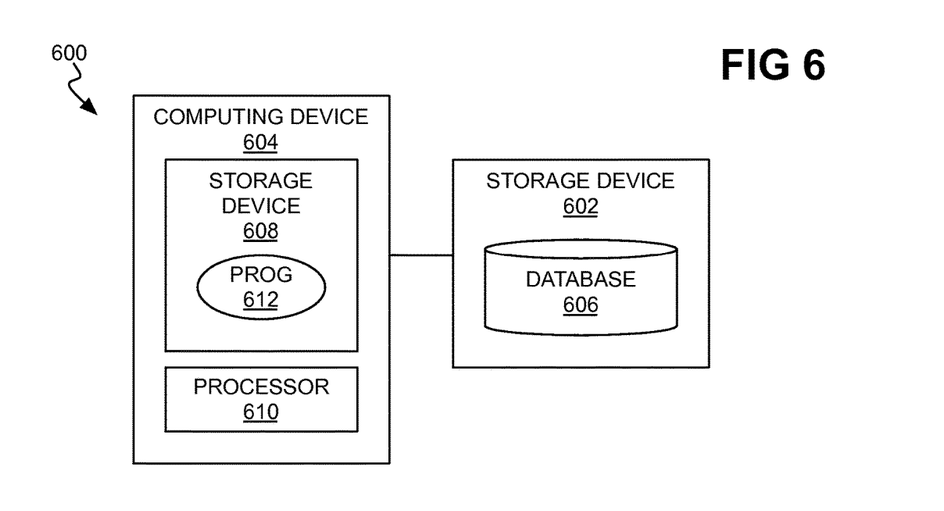
FIG. 6 is a diagram of an example system.

FIG. 6 shows an example system 600 by which the techniques that have been disclosed herein can be performed. The system 600 includes a storage device 602 and a computing device 604. The system 600 can include other devices as well, in addition to or in lieu of the devices 602 and 604. The devices 602 and 604 may be directly connected to one another when both are present, they may be connected to one another indirectly over a network, and so on. The storage device 602 may be part of a different system or subsystem, such as a storage-area network (SAN), and stores a database 606 of permissible and/or predictive builds in relation to which the method 400 is performed, as has been described.

The computing device 604 may be one or more such computing devices, like desktop computers, laptop computers, server computing devices, and so on. The computing device 604 includes at least a storage device 608 and a processor 610. In an implementation in which the storage device 602 is not present, the database 606 may be stored on the storage device 608 instead. The storage device 608 is a non-volatile storage device like a hard disk drive and/or a flash drive (as is the storage device 602), and the computing device 604 also typically includes a volatile storage device as well, such as semiconductor memory. The storage device 608 stores a computer program 612 that the processor 610 executes to perform the methods 400 and/or 500 that have been described.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A storage device storing a computer program executable by a processor to perform a method comprising:
    selecting a plurality of features to include within a predictive build of a computing system, the predictive build being an anticipated final build of the computing system prior to receiving a firm customer order for the computing system in accordance with which an actual final build of the computing system is then built;
    wherein selecting the features from a plurality of potential features based on a classification of each potential feature that was included in a past customer order of the computing system, wherein the classification of each potential feature, as a given potential feature, corresponds to a marginal cost of including the given potential feature within the predictive build of the computing system; and
    a distribution of each potential feature, as the given potential feature, within past customer orders of the computing system, the distribution indicating how often the given potential feature was present within the past customer orders;
    wherein each potential feature, as the given potential feature, is classified within one of a plurality of tiers ordered from a highest marginal cost tier to a lowest marginal cost tier, and selecting the features from the potential features comprises: selecting any potential feature that is classified within the highest marginal cost tier, up to a predetermined maximum number of the features;
    estimating a marginal cost of first building the predictive build and then modifying the predictive build to realize the actual final build, as compared to building the actual final build without first building the predictive build and then modifying predictive build to realize the actual final build, based on the features selected;
    responsive to determining that the marginal cost is less than a predetermined acceptable marginal cost limit, indicating that the predictive build should be built prior to receiving the firm customer order, and causing the computing system to be built in accordance with the predictive build thereof prior to receiving the firm customer order; and
    responsive to determining that the marginal cost is greater than the predetermined acceptable marginal cost limit, indicating that the predictive build should not be built prior to receiving the firm customer order, and causing the computing system to be built in accordance with the predictive build thereof after receiving the firm customer order, wherein estimating the marginal cost comprises adding together a marginal cost value for each feature to realize the marginal cost of first building the predictive build and then modifying the predictive build to realize the actual final build,
    wherein the computing system is built in accordance with the predictive build, and thereafter tested and shipped to a customer.

2. The storage device of claim 1, wherein each potential feature, as the given potential feature, is classified within one of a plurality of tiers ordered from a highest marginal cost tier to a lowest marginal cost tier, and selecting the features from the potential features comprises:
    selecting any potential feature that is classified within the highest marginal cost tier, up to a predetermined maximum number of the features; and
    where the predetermined maximum number of the features has not been reached, selecting the potential features that were most often present within the past customer orders until the predetermined maximum number of the features has been reached.

3. The storage device of claim 1, wherein selecting the features from the potential features further comprises:
    where the predetermined maximum number of the features has not been reached, selecting the potential features that were most often present within the past customer orders until the predetermined maximum number of the features has been reached.

4. The storage device of claim 1, wherein the method further comprises, upon realizing the actual final build:

in response to determining that an actual marginal cost of first building the predictive build and then modifying the predictive build to realize the actual final build was less than the predetermined acceptable marginal cost limit, archiving the predictive build within a database as a permissible predictive build to build in the future.

5. The storage device of claim 4, wherein the method further comprises, after selecting the features to include within the predictive build:

in response to determining that the predictive build is identical to any permissible predictive build within the database, proceeding to build the predictive build prior to receiving the firm customer order and modify the predictive build to realize the actual final build upon receiving the first customer order, without having to estimate the marginal cost and without having to determine that the marginal cost is less than the predetermined acceptable marginal cost limit.

6. The storage device of claim 1, wherein the marginal cost value for each feature, as the given feature, is equal to the marginal cost of including the given feature within the predictive build multiplied by a number of the instances of the given feature to be included within the predictive build.

7. The storage device of claim 6, wherein the number of instances of the given feature to be included within the predictive build is selected as a sum of a mean of a distribution of the given feature within past customer orders of the computing system and a predetermined value, the distribution indicating how often the given potential feature was present within the past customer orders.

8. The storage device of claim 7, wherein the predetermined value is equal to a standard deviation of the distribution multiplied by a predetermined positive constant.

9. The storage device of claim 8, wherein the marginal cost of including the given feature within the predictive build is equal to a sum of a first cost or time, a second cost or time, and a third cost or time, wherein the first cost or time is associated with installing the given feature into the computing system, the second cost or time is associated with arranging the given feature into a desired configuration of the computing system, and the third cost or time is associated with testing the given feature into the desired configuration of the computing system.

10. A system comprising:

a processor;

a storage device storing computer-executable code that the processor executes to:

select a plurality of features to include within a predictive build of a computing system, the predictive build being an anticipated final build of the computing system prior to receiving a firm customer order for the computing system in accordance with which an actual final build of the computing system is then built;

selecting the features from a plurality of potential features based on: a classification of each potential feature that was included in a past customer order of the computing system, wherein the classification of each potential feature, as a given potential feature, corresponds to a marginal cost of including the given potential feature within the predictive build of the computing system; and a distribution of each potential feature, as the given potential feature, within past customer orders of the computing system, the distribution indicating how often the given potential feature was present within the past customer orders;

wherein each potential feature, as the given potential feature, is classified within one of a plurality of tiers ordered from a highest marginal cost tier to a lowest marginal cost tier, and selecting the features from the potential features comprises: selecting any potential feature that is classified within the highest marginal cost tier, up to a predetermined maximum number of the features;

estimate a marginal cost of first building the predictive build and then modifying the predictive build to realize the actual final build, as compared to building the actual final build without first building the predictive build and then modifying predictive build to realize the actual final build, based on the features selected;

responsive to determining that the marginal cost is less than a predetermined acceptable marginal cost limit, indicate that the predictive build should be built prior to receiving the firm customer order, and cause the computing system to be built in accordance with the predictive build thereof prior to receiving the firm customer order; and responsive to determining that the marginal cost is greater than the predetermined acceptable marginal cost limit, indicate that the predictive build should not be built prior to receiving the firm customer order, and cause the computing system to be built in accordance with the predictive build thereof after receiving the firm customer order, wherein the marginal cost is estimated by adding together a marginal cost value for each feature to realize the marginal cost of first building the predictive build and then modifying the predictive build to realize the actual final build, wherein the computing system is built in accordance with the predictive build, and thereafter tested and shipped to a customer.

11. The system of claim 10, wherein each potential feature, as the given potential feature, is classified within one of a plurality of tiers ordered from a highest marginal cost tier to a lowest marginal cost tier, and selecting the features from the potential features comprises:

selecting any potential feature that is classified within the highest marginal cost tier, up to a predetermined maximum number of the features; and where the predetermined maximum number of the features has not been reached, selecting the potential features that were most often present within the past customer orders until the predetermined maximum number of the features has been reached.

12. The system of claim 10, wherein selecting the features from the potential features further comprises:

where the predetermined maximum number of the features has not been reached, selecting the potential features that were most often present within the past customer orders until the predetermined maximum number of the features has been reached.

13. The system of claim 10, further comprising:

a database, wherein the computer-executable code is executable by the processor to further, upon realizing the actual final build:

in response to determining that an actual marginal cost of first building the predictive build and then modifying the predictive build to realize the actual final build was less than the predetermined acceptable marginal cost limit, archive the predictive build within the database as a permissible predictive build to build in the future.

14. The system of claim 13, wherein the computer-executable code is executable by the processor to further, after selecting the features to include within the predictive build:

in response to determining that the predictive build is identical to any permissible predictive build within the database, proceed to build the predictive build prior to receiving the firm customer order and modify the predictive build to realize the actual final build upon receiving the first customer order, without having to estimate the marginal cost and without having to determine that the marginal cost is less than the predetermined acceptable marginal cost limit.

15. The system of claim 10, wherein the marginal cost value for each feature, as the given feature, is equal to the marginal cost of including the given feature within the predictive build multiplied by a number of the instances of the given feature to be included within the predictive build.

16. The system of claim 15, wherein the number of instances of the given feature to be included within the predictive build is selected as a sum of a mean of a distribution of the given feature within past customer orders of the computing system and a predetermined value, the distribution indicating how often the given potential feature was present within the past customer orders.

* * * * *